United States Patent [19]

Hunger et al.

[11] Patent Number: 4,563,013
[45] Date of Patent: Jan. 7, 1986

[54] DRILL CHUCK FOR A HAND-HELD DRILLING DEVICE

[75] Inventors: Josef Hunger, Olching; Hans-Christian Donner, Munich; Anton Neumaier, Furstenfeldbruck, all of Fed. Rep. of Germany

[73] Assignee: Hilti Aktiengesellschaft, Schaan Fürstentum, Liechtenstein

[21] Appl. No.: 591,516

[22] Filed: Mar. 20, 1984

[30] Foreign Application Priority Data

Mar. 22, 1983 [DE] Fed. Rep. of Germany ....... 3310372

[51] Int. Cl.$^4$ ............................................. B23B 31/12
[52] U.S. Cl. ..................................... 279/64; 279/1 K; 279/60
[58] Field of Search .................... 279/1 K, 60, 61, 62, 279/63, 64, 19, 19.1, 19.2, 19.3, 19.4, 19.5, 19.6, 19.7; 173/132; 81/90 A

[56] References Cited

U.S. PATENT DOCUMENTS

| 3,677,657 | 7/1972 | Brucker | 279/1 K X |
| 4,083,571 | 4/1978 | Schadlich et al. | 279/61 |
| 4,213,622 | 7/1980 | Rohm | 279/1 K |
| 4,213,623 | 7/1980 | Rohm | 279/60 |
| 4,395,170 | 7/1983 | Clarey | 279/62 X |
| 4,418,927 | 12/1983 | Rohm | 279/62 |

FOREIGN PATENT DOCUMENTS 2826153 12/1979 Fed. Rep. of Germany ........ 279/19

Primary Examiner—William R. Briggs
Assistant Examiner—Glenn L. Webb
Attorney, Agent, or Firm—Toren, McGeady, Stanger, Goldberg & Kiel

[57] ABSTRACT

A drill chuck for a hand-held drilling device, such as a hammer drill, percussion drill or the like, includes a chuck body mounting a plurality of clamping jaws. An adjusting sleeve is rotatably mounted on the chuck body for positioning a partly frusto-conically shaped bracing sleeve for radially positioning the clamping jaws to secure or release a tool shank. The adjusting sleeve includes gear teeth which can be engaged by a ring gear key for rotating the adjusting sleeve relative to the chuck body. A locking sleeve is axially displaceably mounted on the adjusting sleeve. In a first position, the locking sleeve blocks engagement of the key with the ring gear teeth. In a second position, the locking sleeve is moved affording access by the key to the ring gear teeth so that the adjusting sleeve can be rotated and the clamping jaws radially positioned by the bracing sleeve.

8 Claims, 6 Drawing Figures

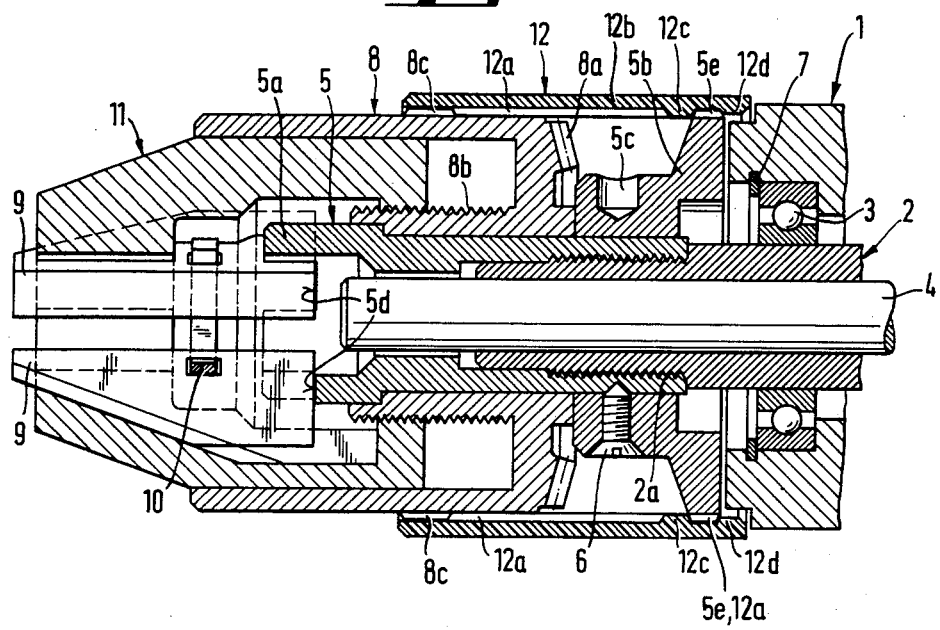
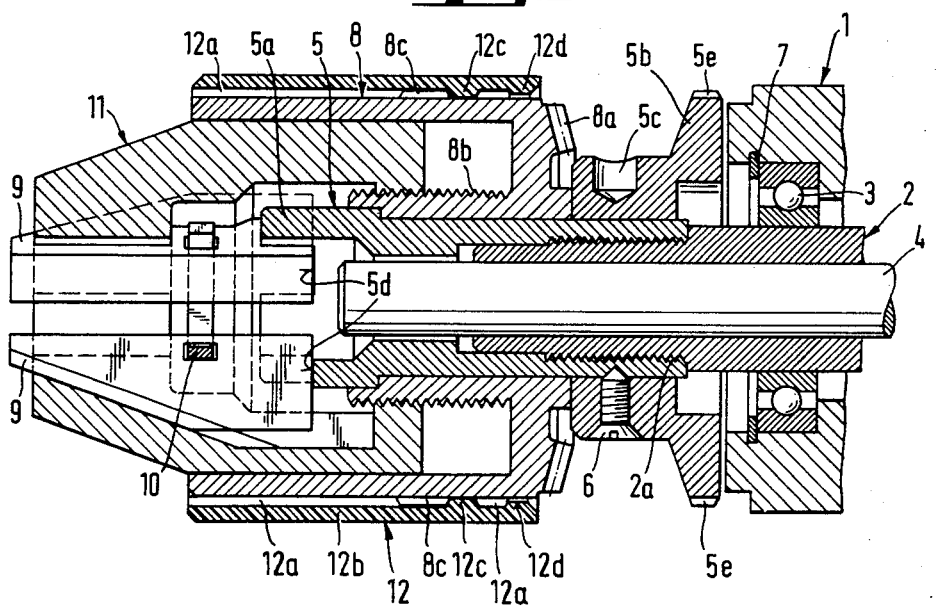

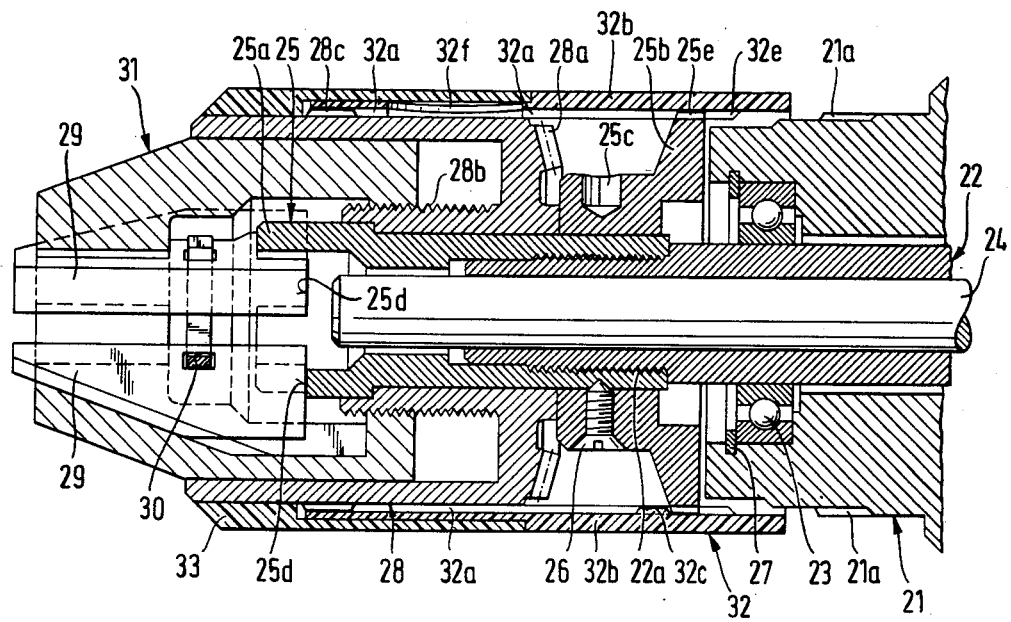
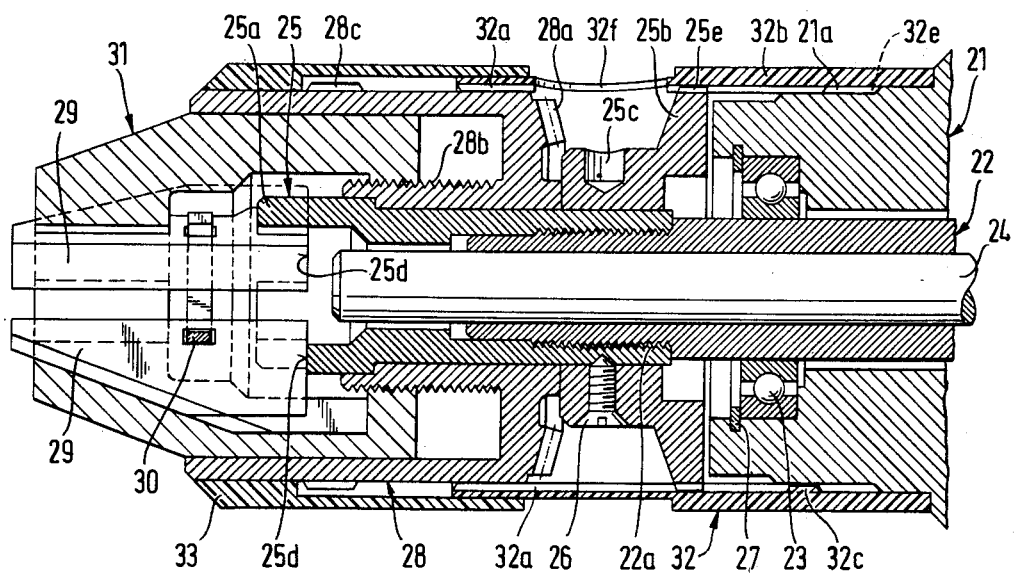

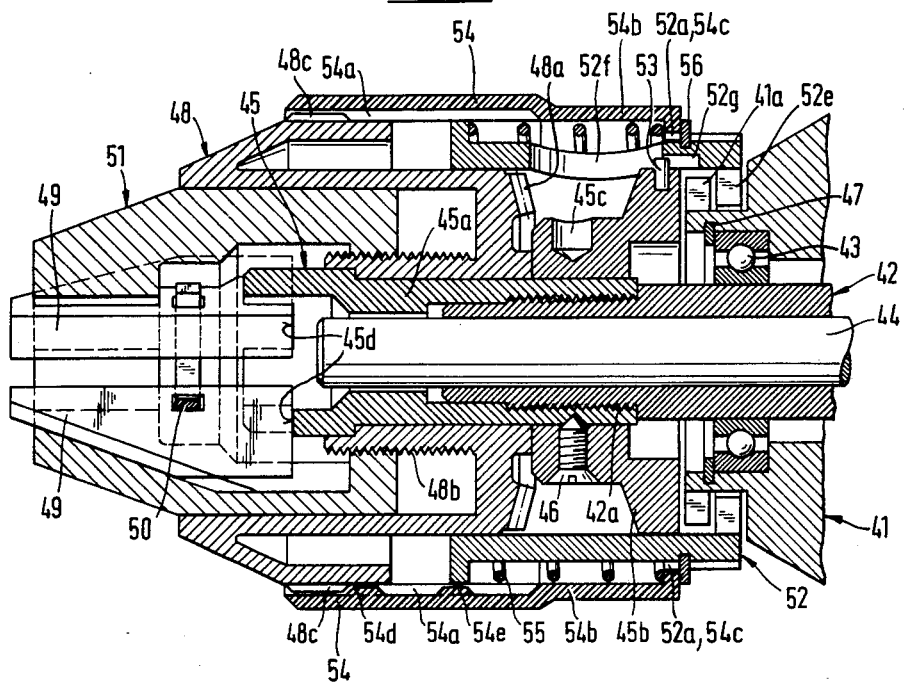
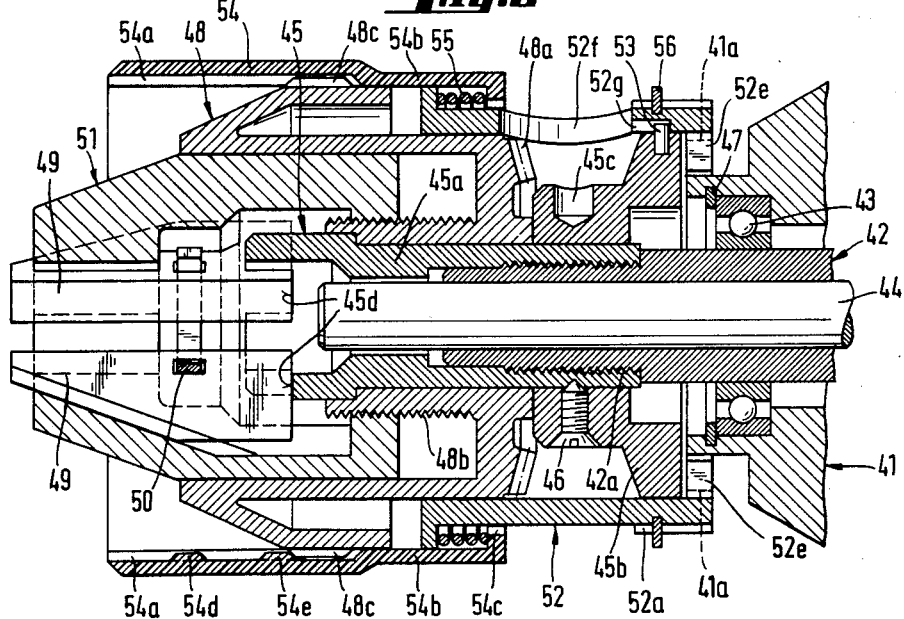

DRILL CHUCK FOR A HAND-HELD DRILLING DEVICE

SUMMARY OF THE INVENTION

The present invention is directed to a drill chuck for a hand-held drilling device, such as a hammer drill, a percussion drill or the like, where the shank of a working tool, such as a drill bit, is secured by at least two clamping jaws radially displaceably supported in a chuck body. The radial position of the clamping jaws is adjusted to the diameter of a tool shank by an adjusting sleeve which can be rotated relative to the chuck body. The adjusting sleeve has beveled gear teeth which can be engaged by a beveled ring gear key insertable into an opening in the chuck body. An axially displaceable locking sleeve is mounted on the adjusting sleeve for selectively affording access of the beveled ring gear key into the opening in the chuck body and with the beveled gear teeth on the adjusting sleeve.

A known drill chuck permits a friction-locking as well as a form-locking clamping of a tool shank. In the form-locking condition, the clamping jaws engage in recesses in the shank of the tool to be held in the chuck. For an optimum transmission of percussive energy to the tool, a certain radial and axial play between the tool and the clamping jaws is necessary. Such play affords a defined axial mobility of the tool shank relative to the clamping jaws. To maintain the desired accuracy of the chuck, the amount of play should not be altered due to vibrations which occur during operation of the drilling device. Accordingly, the known drill chuck includes a locking sleeve for preventing the adjusting sleeve from rotating relative to the chuck body.

When the tool shank is clamped in a friction-type locking condition, the clamping jaws must be pressed radially inwardly against the tool shank. Usually, the manual turning action is insufficient to provide the desired locking action. As a result, a beveled ring gear key is inserted into a receiving opening in the chuck body and is in meshed engagement with beveled gear teeth on the adjusting sleeve. In the drill chuck mentioned above, the beveled gear teeth are arranged at the front end of the adjusting sleeve. Accordingly, the receiving opening for the key is located in the front region of the chuck body. As a result, the beveled gear teeth and the receiving opening for the key are completely unprotected against the penetration of dirt from bore drillings. In particular, when the drilling device is used in a ceiling or roof, that is, when the drilling tool is directed upwardly, the beveled gear teeth and the receiving opening, after a short time, are at least partially blocked by the dust developed in the drilling operation with the result that it is no longer possible to engage the beveled ring gear key.

Therefore, the primary object of the present invention is to provide a drill chuck which prevents the penetration of dirt and has a low susceptibility to operational problems.

In accordance with the present invention, the beveled gear teeth are arranged on the adjusting sleeve at a location spaced from the front end of the chuck, that is, the end where the tool shank is inserted into the chuck. The receiving opening for the beveled ring gear key is located in the chuck body between the front end of the housing for the drilling device and the adjusting sleeve. A locking sleeve is axially displaceably mounted on the adjusting sleeve and a part of the locking sleeve forms a cover over the beveled gear teeth and the receiving opening for the key so that the adjusting sleeve cannot be rotated relative to the chuck body.

Accordingly, with the beveled gear teeth located at the rear part of the chuck near the front end of the drill housing on which the chuck is mounted, and with the cover provided by the locking sleeve, the beveled gear teeth and the receiving opening for the key in the chuck body are protected against the penetration of fine drillings, that is, the dust-like material generated in the drilling operation. As a result, even after a long drilling operation, the beveled ring gear key can be engaged with the beveled gear teeth on the adjusting sleeve without any difficulty. By axially displacing the locking sleeve from the position blocking access to the beveled gear teeth on the adjusting sleeve, the receiving opening for the key in the chuck body is also automatically accessible.

The locking sleeve can be mounted on the drill chuck in various ways. To provide a fine adjustment of the clamping action, that is, the holding action of the clamping jaws on the shank of the tool to be held in the drill chuck, it is advisable to provide inner gear teeth on the locking sleeve and outer gear teeth on the chuck body to interconnect the locking sleeve and the chuck body. Such an arrangement of gear teeth also affords a compact construction of the drill chuck. Functionally, it is sufficient to provide a complete set of gear teeth on only one of the parts so that a single gear tooth in sufficient on the other part.

In known drill chucks, there is a gap between the drill chuck and the end of the housing of the drilling device and drillings generated by the operation of the device can penetrate into the bearing in the housing. To prevent the passage of the drillings into the housing, it is advisable to arrange the locking sleeve so that it projects axially from the chuck body rearwardly over the housing of the drilling device. With the locking sleeve extending rearwardly from the chuck body over the housing, the gap between the chuck and the housing is covered and drillings are prevented, to a great extent, from penetrating into the bearing within the housing.

When the drill chuck is manually adjusted, it is possible that the chuck can turn along with the spindle or piston in the housing. To prevent such a possibility, the locking sleeve is provided with stops in the region extending over the trailing end of the chuck body so that the stops can engage the drilling device housing. Such stops can be in the form of teeth or a claw coupling. A single cam and a corresponding cooperating recess can also be used, in principle, as a stop. With such a construction, there is only one locking position for each revolution of the drill spindle.

The stops on the locking sleeve can be formed in various ways, for instance, as a radially adjustable locking bar. For simple handling, it is advisable that the stops be engaged with the drilling device housing by the axial displacement of the locking sleeve. Accordingly, the connection of the locking sleeve with the housing and the blocking of the drill spindle for adjusting the drill chuck can be effected in the manner of a clutch. A corresponding construction of the stops can enable the blocking to be automatically eliminated when the device is started.

To limit the displacement path of the locking sleeve and to provide a short constructional length of the drill chuck, it is preferable if the locking sleeve has an opening which can be aligned with the receiving opening in the chuck body permitting the beveled ring gear key to extend through the opening into meshed engagement with the beveled teeth on the adjusting sleeve. With such a locking sleeve, the beveled gear teeth on the adjusting sleeve are covered when a drilling tool is secured within the drill chuck so that injuries to the operator caused by the beveled gear teeth and also to the teeth themselves can be prevented.

The locking sleeve must engage both the chuck body and the adjusting sleeve. Moreover, the locking sleeve must be capable of both blocking and affording access to the receiving opening and the beveled gear teeth. To afford all of these features and still provide an axially compact construction, it is advantageous if the locking sleeve has a bush or adapter cap for locking the connection of the chuck body with the adjusting sleeve so that the bush or adapter sleeve is axially displaceable and engageable with teeth on the locking sleeve. Accordingly, the locking sleeve is formed of two parts with the parts being axially displaceable relative to one another. The parts can be interconnected so that they can be axially displaced relative to one another.

During the transmission of percussive energy to the drilling tool, a part of the percussive energy is converted into heat. In time, such heat results in a substantial increase in the temperature of the drill chuck so that it cannot be handled without gloves. To permit the adjustment of the drill chuck without the use of gloves, even after a long operation of the drilling device, it is preferable if the locking sleeve is formed of a heat-resistant, poor heat-conductive material. Various plastics materials are particularly suitable as heat-resistant materials.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawing

FIG. 1 is a axially extending sectional view of a drill chuck embodying the present invention with the chuck shown in the operating condition;

FIG. 2 is a view similar to FIG. 1, however, illustrating the chuck in the released or open condition;

FIG. 3 is a view of another embodiment of a drill chuck similar to FIG. 1 showing the chuck in the working or drilling condition;

FIG. 4 is a sectional view, similar to FIG. 3, illustrating the drill chuck in the unlocked or open condition;

FIG. 5 is a third embodiment of a drill chuck, incorporating the present invention, shown in axial section and with the chuck in the working condition; and FIG. 6 is a sectional view similar to FIG. 5, however, showing the drill chuck in the opened or unlocked condition.

DETAILED DESCRIPTION OF THE PREFERRED EMBODIMENTS

In FIGS. 1 and 2, the front or chuck end of a drilling device housing 1 is shown. A guide sleeve 2 is rotatably supported in the housing 1 by a bearing 3 and the guide sleeve extends forwardly into the rear end of the chuck. Adjacent its front end located within the chuck, the guide sleeve 2 has a male thread 2a. A percussion anvil or piston 4 is slidably supported in the guide sleeve 2. The drill chuck includes a chuck body 5 in threaded connection with the thread 2a on the guide sleeve 2 so that it cannot be rotated nor is it axially displaceable relative to the guide sleeve. For constructional reasons, the chuck body 5 is formed of a tubular part 5a projecting axially forwardly from the guide sleeve 2 and a flange part 5b mounted on the rear end of the tubular part. The tubular part 5a and flange part 5b are secured together by a screw 6 so that the two parts cannot be moved rotatably or axially relative to one another. Within the housing 1, bearing 3 is secured against axial displacement by a securing ring 7 fitted into the inside surface of the housing and supporting the front side of the bearing. The rear side of the bearing is supported against a shoulder formed on the housing 1. Within the drill chuck located ahead of the housing 1 is an adjusting sleeve 8 rotatably supported on the outside surface of the tubular part 5a. At the rear end of the adjusting sleeve 8, beveled gear teeth 8a are provided in a ring. By engaging a beveled ring gear key, known per se and not illustrated, in meshed engagement with the beveled teeth 8a, the adjusting sleeve can be rotated about the tubular part 5a. A key receiving opening 5c is located in the flange part 5b of the chuck just to the rear of the teeth 8a. At the front end of the chuck body 5, clamping jaws 9a are positioned within axially extending slots 5d formed in the tubular part 5a. The clamping jaws extend forwardly from the front end of the tubular part 5a within a partly frusto-conically shaped bracing sleeve 11. An annular spring 10 extends through the clamping jaws 9a and biases the jaws radially outwardly against the frusto-conically shaped inside surface of the bracing sleeve 11. The bracing sleeve 11 is in threaded engagement with a thread 8b on the adjusting sleeve 8. Note that the bracing sleeve 11 extends into an annular recess formed by the adjusting sleeve 8 so that the rear end of the adjusting sleeve is supported radially inwardly and radially outwardly by the adjusting sleeve 8. When the adjusting sleeve 8 is rotated about the outside surface of the tubular part 5a of the chuck body 5, the bracing sleeve 11 is axially displaced causing the clamping jaws 9 to move radially inwardly or outwardly depending on the direction in which the bracing sleeve is displaced. The bracing sleeve 11 is held from being rotated along with the adjusting sleeve 8 due to the manner in which the clamping jaws, secured in the chuck body 5, interengage the bracing sleeve and prevent any rotational movement. Note that the clamping jaws fit into slotted portions of the bracing sleeve 11. An axially displaceable locking sleeve 12, as shown in FIG. 1, is located around the rear portion of the adjusting sleeve 8 extending over the flange part 5b of the chuck body 5 and projecting rearwardly over the front end of the housing 1. The locking sleeve 12 has teeth 12a on its inside surface and these teeth are in permanent engagement with outwardly extending teeth 8c on the outer surface of the adjusting sleeve 8.

In the operating or working condition of the drilling device shown in FIG. 1, the locking sleeve 12 is engaged with outer teeth 5e on the radially outer surface of the flange part 5b of the chuck body 5. Accordingly, the adjusting sleeve 8 and the chuck body 5 are connected together by the locking sleeve 12 so that they cannot be rotated relative to one another. As a result, it is not possible to adjust the drill chuck in the condition or position of the drilling device as shown in FIG. 1. Moreover, locking sleeve 12 has an axially extending portion 12b closer to the housing 1, as shown in FIG. 1, forming a cover over the receiving opening 5c in the chuck body and also over the beveled teeth 8a on the rear end of the adjusting sleeve 8. The locking sleeve portion 12b, therefore, protects the receiving opening 5c and the beveled teeth 8a from any penetration of the drillings generated by the drilling device. Cams 12c, 12d are arranged at the inside surface of the locking sleeve 12 adjacent its rear end with each cam located on an opposite side of the teeth 5e located on the radially outer surface of the flange part 5b of the chuck body 5. The cams prevent the locking sleeve 12 from being accidentally displaced in the axial direction. Moreover, with the rear end of the locking sleeve 12 projecting rearwardly from the rear end of the chuck body 5 over the front end of the housing 1, the gap between the drill chuck and the housing 1 is covered and the passage of dust or drillings into the interior of the housing into the bearing 3 is prevented to a great extent.

To adjust the drill chuck, the locking sleeve 12 is displaced axially away from the housing 1 into the position shown in FIG. 2. To displace the locking sleeve 12, the retaining force of the cam 12d must be overcome. The cam 12c, during the forward movement of the locking sleeve 12, moves into contact with the rear end of the teeth 8c so that the rear end of the locking sleeve is displaced just forwardly of the beveled teeth 8a on the adjusting sleeve 8. In the forwardly displaced position of the locking sleeve 12, the receiving opening 5c in the chuck body 5 and the beveled teeth 8a on the adjusting sleeve 8 are uncovered and a beveled gear ring key, known per se and not shown, can be inserted into the receiving opening so that its teeth engage the beveled teeth 8a. By turning the key, the clamping jaws 9 can be adjusted to the corresponding diameter of the tool shank inserted into the chuck body so that the drilling device is ready to be used and the locking sleeve 12 can be moved back into the position illustrated in FIG. 1. During the transmission of percussive energy from the anvil or piston 4 to the end of a tool secured in the drill chuck, a part of the energy is converted into heat which, in time, leads to an increase in the temperature of the drill chuck. To be able to adjust the drill chuck even after a long period of drilling, the locking sleeve is preferably formed from a heat-resistant, poor heat-conductive material. When such material is used, the drill chuck can be handled and adjusted without gloves, even after a long period of operation.

In FIGS. 3 and 4, another embodiment of a drill chuck incorporating the present invention, is shown. In FIG. 3, the drill chuck is in position for operation, while in FIG. 4 the chuck body is in position to be adjusted. In the right in each figure, the front end of a housing 21 for the drilling device is shown. On the outside surface of the housing 1 adjacent its front end, there are provided teeth 21a. A guide sleeve 22 is rotatably supported within the housing 21 by a bearing 23 located adjacent the front end of the housing. The guide sleeve 22 projects outwardly from the housing and has an outside or male thread 22a located on the portion of its outside surface spaced outwardly from the housing 21. A percussion anvil or piston 24 is axially displaceably supported in the guide sleeve 22. The guide sleeve 22 is in threaded engagement with a chuck body 25 by means of the outer thread 22a. Chuck body 25 is formed of a tubular part 25a in threaded engagement with the guide sleeve 22 and a flange part 25b secured to the rear end of the tubular part and extending radially outwardly. The flange part 25b extends rearwardly from the tubular part 25a with the rear end of the flange part spaced closely from the front end of the housing 21. A screw 26 secures the flange part 25b to the tubular part 25a. Bearing 23 is secured in the front end of the housing 21 by a securing ring 27. The flange part 25b of the chuck body 25 has a receiving opening 25c for a beveled ring gear key, not illustrated. An adjusting sleeve 28 is mounted on the outside surface of the tubular part 25a of the chuck body so that it cannot move axially relative to the chuck body but can rotate relative to it. The rear end of the adjusting sleeve 28 has beveled gear teeth 28a facing toward the flange part 25b of the chuck body. The front end of the tubular part 25a of the chuck body is provided with axially extending slots 25b in which clamping jaws 29 are held. Clamping jaws 29 are biased radially outwardly against a partly frusto-conically shaped bracing sleeve 31 by an annular spring 30. Note the annular spring 30 extends through slots in the clamping jaws 29. The bracing sleeve is in threaded engagement with the thread 28b on the surface of the adjusting sleeve 28. Note that the adjusting sleeve 28 forms an annular space containing the rear part of the bracing sleeve 31 so that the radially outer surface of the bracing sleeve in its rear portion bears against the surface of the adjusting sleeve in addition to the threaded connection with the thread 28b on the radially inner part of the adjusting sleeve. Accordingly, the bracing sleeve 31 is displaced in the axial direction when the adjusting sleeve 28 is rotated around the tubular part 25a of the chuck body 25. As can be seen in FIGS. 3 and 4, the clamping jaws are secured within the slots 25d in the chuck body and they also engage in recessed parts in the inside surface of the bracing sleeve so that the bracing sleeve is prevented from rotating along with the adjusting sleeve 28. As can be seen in FIG. 3, the flange part 25b of the chuck body and the axial extent of the adjusting sleeve 28 are enclosed by an axially displaceable locking sleeve 32. Locking sleeve 32 has teeth 32e on its inside surface which engage with the corresponding outer teeth 28c on the adjusting sleeve as well as with a tooth 25e on the outside surface of the flange part 25b of the chuck body. The locking sleeve 32 has a rear part 32b which, in FIG. 3, forms a cover over the receiving opening 25c and the beveled teeth 28a. A cam 32c formed on the inside surface of the rear part 32b prevents any accidental displacement of the locking sleeve 32. Further, the rear part 32b of the locking sleeve 32 includes a forward part telescoped within a protective sleeve 33 so that the front part containing opening 32f can be moved, as shown in FIG. 4, into the position where the opening 32f aligns with the receiving opening 25c in the chuck body 25 for the key, not shown. The rear end of the locking sleeve 32 extending over the chuck body 25 has stops 32e formed on its inside surface which interengage with the teeth 25a on the outside of the housing 21. The portion of the locking sleeve 32 projecting rearwardly from the rear end of the chuck body 25 forms a cover over the gap between the rear end of the drill chuck and the front of the housing 21 preventing the penetration of drillings into the bearing 23 located within the housing.

When the locking sleeve 32 is in the position shown in FIG. 3, it is not possible to rotate the adjusting sleeve 28 relative to the chuck body 25. When the rear part of the locking sleeve 32 is displaced axially rearwardly over the front part of the housing 21, the engagement of the locking sleeve with the outer teeth 28c on the adjusting sleeve 28 is released and the adjusting sleeve is then freely rotatable. When the locking sleeve is in the position shown in FIG. 4, the beveled teeth 28 and the receiving opening 25 are located within the inward projection of the opening 32f so that a beveled ring gear key can be inserted into the receiving opening and into meshed engagement with the beveled teeth 28a. Further, with the locking sleeve displaced rearwardly, the stops 32e on the inside surface engage the outer teeth 21a on the housing preventing rotation of the drill spindle. By preventing such rotation, the adjustment of the drill chuck is facilitated. In the position shown in FIG. 3, the forward part of the locking sleeve 32 containing the opening 32f is located within the protective sleeve 33 which is pressed onto the outside surface of the adjusting sleeve 28. The protective sleeve 33 affords a cover over the outer teeth 28c on the adjusting sleeve 28 so that the adjusting sleeve can be manually adjusted without difficulty in the position of the locking sleeve 32 shown in FIG. 4. Due to increased temperature which occurs during the drilling operation, as mentioned above, it is advisable that both the locking sleeve 32 and the protective sleeve 33 are formed of a heat-resistant, poor heat-conductive material, such as a plastics material.

In FIGS. 5 and 6, a third embodiment of the present invention is illustrated including the front end of a housing 41 with a guide sleeve 42 supported in the housing in a bearing 43. The guide sleeve 42 projects out of the front end of the housing and has an outside thread 42a spaced outwardly from the housing. A percussion anvil or piston 44 is axially displaceably supported in the guide sleeve 42. A chuck body 45 is in threaded engagement with the guide sleeve 42 by means of the outside thread 42a so that the chuck cannot rotate and is not axially displaceable relative to the guide sleeve. The chuck body 45, for construction reasons, is made up of a tubular part 45a and a flange part 45b connected together by a screw 46 so that the two parts cannot rotate relative to one another and are not axially displaceable relative to one another. An adjusting sleeve 48 is rotatably supported on and extends around the tubular part 45a of the chuck body. The rear end of the adjusting sleeve spaced outwardly from the front end of the housing has beveled teeth 48a. In the flange part 45b of the chuck body 45, there is a receiving opening 45c spaced rearwardly of the beveled teeth 45a. A beveled ring gear key can be inserted into the receiving opening 45c so that its teeth engage the beveled teeth 45a on the adjusting sleeve for effecting the rotation of the adjusting sleeve. Such a key is known per se and is not illustrated. The front end of the tubular part 45a of the chuck body 45 has axially extending slots 45d in which clamping jaws 49 are positioned. The clamping jaws 49 are biased radially outwardly by an annular spring 50 extending through the clamping jaws against a frusto-conical inside surface of a bracing sleeve 51. Only the forward portion of the bracing sleeve 51 is frusto-conically shaped, the rearward end seated with the annular recess in the adjusting sleeve 48 is cylindrically shaped. The bracing sleeve 51 is in threaded engagement with the thread 48b on the adjusting sleeve 48.

When the adjusting sleeve is rotated around the tubular part 45a, the bracing sleeve 51 is displaced axially and the clamping jaws are adjusted in the radial direction. Depending on the direction of movement of the adjusting sleeve 48, the bracing sleeve 51 either permits the clamping jaws to move radially outwardly for releasing a tool shank held within the chuck or to move radially inwardly to grip and secure a tool shank within the chuck. As can be seen in FIG. 5, the flange part 45b and the rear end of the adjusting sleeve 48 containing the beveled teeth 48a are enclosed by an axially displaceable locking sleeve 52. Locking sleeve 52 is connected with the chuck body 45 so that it cannot be rotated relative to the chuck body due to the pin 53 mounted in the flange part 45b extending radially outwardly into a groove 52g located in the inside surface of the locking sleeve. Locking sleeve 52 has an opening 52f through which a beveled ring gear key can be inserted into the receiving opening 45c and engage the beveled teeth 48a. In FIG. 5, the opening 52f is displaced slightly to the rear so that a part of the sleeve 52 is located above the beveled teeth 48a. Further, the locking sleeve 52 includes a locking jacket or bush sleeve 54 which is axially displaceable relative to the locking sleeve. The locking jacket 54 has teeth 54a located on its inside surface which are in continuous engagement with the outer teeth 48c on the outside surface of the adjusting sleeve 48. As can be seen in FIG. 5, the locking jacket 54 has an axially extending portion 54b which forms a cover over the opening 52f in the locking sleeve so that it prevents access to the receiving opening 45c and the beveled teeth 48a. The rear end of the locking jacket 54 has inwardly directed teeth 54c which engage with teeth 54a on the outside surface of the locking sleeve 52. The locking jacket 54 and the locking sleeve 52 are biased into the position shown in FIG. 5 by a spring 55 extending between shoulders formed on the locking jacket 54 and on the locking sleeve 52. A securing locking ring 56 secured in the outside surface of the locking sleeve 52 near its rear end forms a stop for the axial displacement of the locking jacket 54 in the rearward direction. In FIG. 5, accidental displacement of the locking jacket 54 is prevented by a cam 54d located near the inside front end of the locking jacket and bearing against the teeth 48c on the outside surface of the adjusting sleeve 48. Another cam 54e located rearwardly of the cam 54d holds the locking jacket 54 in the position shown in FIG. 6 after it has been displaced forwardly against the force of the spring 55.

The rear end of locking sleeve 52 is provided with stops 52e which extend radially inwardly and can engage with the claws 41a projecting outwardly from the front end of the housing 41. In the position shown in FIG. 5, the adjusting sleeve 48 is connected with the chuck body 45 so that it cannot be rotated relative to it due to the interengagement of the jacket sleeve 54 with the adjusting sleeve and the engagement of the pin 53 in the groove 52g. Since the adjusting sleeve cannot be rotated relative to the chuck body in the position shown in FIG. 5, radial adjustment of the clamping jaws 49 is also prevented. The locking jacket 54 is fixed against axial displacement relative to the adjusting sleeve by the cam 54d so that any accidental displacement of the locking jacket 54 and the locking sleeve 52 cannot occur during drilling.

In FIG. 6, the locking jacket 54 is displaced forwardly against the biasing action of the spring 55. When the locking jacket 54 is moved axially forwardly, the teeth 54c are released from engagement with the teeth 52a on the locking sleeve 52. In contrast, the teeth 54a remain in engagement with the teeth 48c on the outside of the adjusting sleeve 48. By pushing the locking jacket 54 axially forwardly, the locking sleeve 52 is also moved in the forward direction. Due to this forward movement, the stops 52e on the locking sleeve 52 engage the claws 41a on the housing 41. Accordingly, when the adjusting sleeve is rotated about the chuck body, the chuck body is prevented from rotating due to the engagement of the pin 53 in the groove 52g. Moreover, when the locking sleeve 52 is displaced axially forwardly from the position shown in FIG. 5 to that illustrated in FIG. 6, the opening 52f moves into registration with the receiving opening 45c in the chuck body 45 and uncovers the beveled teeth 48a on the rear end of the adjusting sleeve so that the beveled ring gear key can be inserted into the receiving opening and into meshed engagement with the beveled teeth 48a. The locking jacket 54 is held in the position illustrated in FIG. 6 by means of the cam 54e which bears against the forward end of the teeth 48c. When the adjustment of the clamping jaws has been effected by the axial displacement of the bracing sleeve 51, the locking jacket 54 and the locking sleeve 52 are returned to the position shown in FIG. 5 and the adjustment of the clamping jaws is fixed because the adjusting sleeve cannot rotate relative to the chuck body and thereby axially displace the bracing sleeve.

While specific embodiments of the invention have been shown and described in detail to illustrate the application of the inventive principles, it will be understood that the invention may be embodied otherwise without departing from such principles.

What is claimed is:

1. A drill chuck for a hand-held drilling device, such as a percussion drill, a hammer drill or the like, arranged to receive and hold the tool shank of a drilling tool, a chuck body having a front end and a rear end and having a central axis extending in the direction between the front end and the rear end thereof, at least two clamping jaws mounted in said chuck body and being radially displaceable relative to the central axis of said chuck body for releasably securing a tool shank in the chuck, adjusting means for selectively positioning said clamping jaws, said adjusting means comprises an adjusting sleeve having a front end and a rear end and an axis extending between the front end and the rear end and parallel to the axis of said chuck body, and a bracing sleeve in engagement with and axially displaceable relative to said adjusting sleeve, said clamping jaws being slidably supported in said bracing sleeve and being mounted in said chuck body, said adjusting sleeve being rotatable relative to said chuck body for axially displacing said clamping jaws relative to said bracing sleeve for selectively securing or releasing said clamping jaws relative to a tool shank, said adjusting sleeve having gear teeth thereon arranged to be in meshed engagement with a ring gear key, said chuck body having an opening therein arranged to receive the key when the key is in meshed engagement with said gear teeth on said adjusting sleeve, a locking sleeve encircling and mounted on said adjusting sleeve and being axially displaceable between a first position and a second position, said gear teeth are located adjacent the rear end of said adjusting sleeve, the rear end of said adjusting sleeve being located between the front end and the rear end of said chuck body, said opening in said chuck body located between the rear end of said adjusting body and the rear end of said chuck body, said locking sleeve providing a cover over said opening in said chuck body in the first position of said locking sleeve for preventing the engagement of the key in said opening and the meshed engagement of the key with said gear teeth so that said adjusting sleeve cannot be rotated relative to said chuck body, and said cover being displaceable in the axial direction of said chuck body in the second position of said locking sleeve for affording engagement of the key in said opening and the meshed engagement of the key with said gear teeth for rotating said adjusting sleeve relative to said chuck body.

2. A drill chuck, as set forth in claim 1, wherein said chuck body having teeth formed on the outside surface thereof and said locking sleeve having teeth formed on the inside surface thereof with said teeth on said chuck body and on said locking sleeve disposed in interengagement when said locking sleeve is in the first position.

3. A drill chuck, as set forth in claims 1 or 2, including a drill housing located at the rear end of said chuck body, said locking sleeve extending from said chuck body over said drill housing in the first position of said locking sleeve.

4. A drill chuck, as set forth in claim 3, wherein said locking sleeve including stops located on the part of said locking sleeve projecting rearwardly over said drill housing and means on said drill housing for engaging said stops on said locking sleeve.

5. A drill chuck, as set forth in claim 4, wherein said stops on said locking sleeve engage said means on said drill housing in the second position of said locking sleeve.

6. A drill chuck, as set forth in claim 5, wherein said locking sleeve having an opening therethrough arranged for alignment with said opening in said chuck body and said beveled teeth on said adjusting sleeve and said opening in said locking sleeve being closed in the first position of said locking sleeve and being open in the second position of said locking sleeve so that in the second position access by the key is available to the opening in said chuck body and to said teeth on said adjusting sleeve.

7. A drill chuck, as set forth in claim 6, wherein said locking sleeve includes an axially displaceable locking jacket and said locking jacket having inwardly directing teeth thereon and said locking sleeve having outwardly directed teeth thereon and said inwardly directing teeth being in meshed engagement with said outwardly directed teeth when said locking sleeve is in the first position, means on said locking jacket in meshed engagement with said adjusting sleeve and means on said locking sleeve in engagement with said chuck body so that in the first position of said locking sleeve the interengagement of said locking sleeve and said locking jacket and the interengagement of said locking jacket with said adjusting sleeve and said locking sleeve with said chuck body prevents rotation of said adjusting sleeve relative to said chuck body.

8. A drill chuck, according to claims 1 or 2, wherein said locking sleeve is formed of a heat-resistant, poor heat-conducting material.

* * * * *